US007348054B2

(12) United States Patent
Jacquiod et al.

(10) Patent No.: US 7,348,054 B2
(45) Date of Patent: Mar. 25, 2008

(54) SUBSTRATE COATED WITH A COMPOSITE FILM, METHOD FOR MAKING SAME AND USES THEREOF

(75) Inventors: Catherine Jacquiod, Gif-sur-Yvette (FR); Jean-Marc Berquier, Deuil la Barre (FR); Sophie Besson, Paris (FR); Jean-Pierre Boilot, Meudon la Foret (FR); Christian Ricolleau, Paris (FR); Thierry Gacoin, Bures sur Yvette (FR)

(73) Assignee: Saint-Gobain Glass France, Courbevoie (FR)

( * ) Notice: Subject to any disclaimer, the term of this patent is extended or adjusted under 35 U.S.C. 154(b) by 250 days.

(21) Appl. No.: 10/484,721

(22) PCT Filed: Jul. 25, 2002

(86) PCT No.: PCT/FR02/02673

§ 371 (c)(1),
(2), (4) Date: Jun. 7, 2004

(87) PCT Pub. No.: WO03/010103

PCT Pub. Date: Feb. 6, 2003

(65) Prior Publication Data
US 2004/0219348 A1  Nov. 4, 2004

(30) Foreign Application Priority Data
Jul. 25, 2001  (FR)  .................................. 01 09901

(51) Int. Cl.
*B32B 3/00*  (2006.01)
(52) U.S. Cl. ................ 428/312.2; 428/312.6; 428/312.8; 428/319.1; 977/811
(58) Field of Classification Search ............. 428/304.4, 428/312.2, 312.6, 315.5, 315.7, 318.4, 319.1, 428/312.8, 446, 428, 688, 702; 977/773, 977/811
See application file for complete search history.

(56) References Cited

U.S. PATENT DOCUMENTS 5,645,891 A  7/1997  Liu et al.
(Continued)

FOREIGN PATENT DOCUMENTS

FR  2 787 350  6/2000
WO  01 32558  5/2001

OTHER PUBLICATIONS

Jun Liu, et al.: "Molecular assembly in ordered mesoporosity: a new class of highly functional nanoscale materials", Journal of Physical Chemistry A, vol. 104, No. 36, pp. 8328-8339, Sep. 14, 2000.
(Continued)

*Primary Examiner*—Jennifer McNeil
*Assistant Examiner*—Timothy M. Speer
(74) *Attorney, Agent, or Firm*—Oblon, Spivak, McClelland, Maier & Neustadt, P.C.

(57) ABSTRACT

This substrate is coated with a composite film based on a mesoporous mineral layer containing nanoparticles formed in situ inside the layer. The composite film has a periodic lattice structure over a major portion of the thickness in which the nanoparticles are present, in which structure the nanoparticles are arranged in a periodic manner on the scale of domains of at least 4 periods in the thickness of the film.

This structure can be obtained from a mesoporous mineral layer of periodic structure on the scale of domains of at least 4 periods of pores, forming a matrix on the substrate, by:
  depositing at least one precursor in the pores of the matrix layer; and
  growing particles derived from the precursor with the spatial distribution and the dimensions being controlled by the structure of the pores of the matrix.

Applications to materials for electronics, nonlinear optics and magnetism.

16 Claims, 3 Drawing Sheets

U.S. PATENT DOCUMENTS

| | | |
|---|---|---|
| 6,027,666 A | 2/2000 | Ozin et al. |
| 6,563,186 B2 * | 5/2003 | Li et al. ............. 257/442 |
| 6,627,319 B2 * | 9/2003 | Jacquiod et al. ......... 428/448 |
| 6,780,499 B2 * | 8/2004 | Gates et al. ............ 428/315.7 |

OTHER PUBLICATIONS

Tang Y S, et al.: "Direct MBE growth of SiGe dots on ordered mesoporous glass-coated Si substrate", Preparation and Characterization, Elsevier Sequoia, vol. 321, No. 1-2, pp. 76-80, May 26, 1998.

* cited by examiner

SUBSTRATE COATED WITH A COMPOSITE FILM, METHOD FOR MAKING SAME AND USES THEREOF

This application is a U.S. National Stage Application, under 35 U.S.C. 371, of International Application No. PCT/FR02/02673 (published under WO 03/010103), filed Jul. 25, 2002, which claims priority to French Application No. 01/09901, filed on Jul. 25, 2001; the entire contents of both of which are hereby incorporated by reference in their entirety.

The present invention relates to the field of thin-film materials that can be applied to substrates in order to give them various functions or properties, especially optical, electrical, magnetic, physical or chemical functions or properties.

It relates more particularly to a substrate coated with a composite film based on a mesoporous mineral layer containing nanoparticles.

The term "nanoparticles" denotes solid particles of nanometric dimensions, that is to say of the order of a few nanometers or a few tens of nanometers. These particles are of particular interest insofar as they may have specific, especially optical and electronic, properties which differ significantly from those of the bulk material. Thus, particular physical properties are observed for particles of nanometric size, such as increased field effects in the case of metals, quantum confinement in the case of semiconductors and superparamagnetism in the case of magnetic compounds.

To obtain particles of defined size that can be distributed in space in a desired arrangement represents a major challenge, especially in the fields of optoelectronics, nonlinear optics, etc.

Some authors have reported studies in which mesoporous materials are used as medium for growing nanocrystals. The term "mesoporous" is understood to mean a porous material whose pores have sizes of between 2 and 50 nm. Below 2 nm, the pores are termed micropores, while above 50 nm they are referred to as macropores.

Most studies deal with mesoporous materials in powder form, such as the family of M41s: these are aluminosilicate materials very similar to zeolites and, like the latter, characterized by a periodic, usually by-continuous hexagonal or cubic, pore lattice in which the pores have a perfectly defined size from 2 to 10 nm. The structuring of the porous material into a periodic pore lattice is associated with the synthesis technique, which consists in condensing the silicate mineral material in the presence of organic structuring agents which organize themselves as micelles and as crystalline phases. After treatment to remove the structuring agents, a porous material is obtained whose pores are the perfect replica of the organic species.

Compared with nonstructured mesoporous solids, such as silica gels for example, the tortuosity of the porous lattice is slight and the developed surface is highly accessible. This allows such materials to be envisioned as support hosts for particles.

However, even in these structured materials, the synthesized particles are generally distributed randomly in the porous matrix and their size is not well controlled.

Studies have also been carried out in the field of thin films deposited on substrates, especially for the purpose of optical applications.

Tang et al., *Thin Solid Films*, 1998, 321, 76-80 reported the penetration of SiGe particles in a mesoporous silica film deposited on a silicon substrate by a sol-gel process inspired by the method of synthesizing M41s.

Using the MBE (molecular beam epitaxy) technique, an SiGe or Ge layer is deposited and grown on the surface of the mesoporous silica film to a thickness of 6 to 70 nm at a growth rate of 0.1 Å/s, which is considered as allowing diffusion of the atoms into the cavities of the mesopores. Photoluminescence measurements make it possible to identify the presence of particles that are located in the mesoporous layer and the dimensions of which correspond to those of the pores of the silica matrix. However, the depth of penetration in the layer is not characterized. In particular, the method used relies on the diffusion of metal atoms into the mesoporous silica layer from the SiGe or Ge surface layer toward the silica/substrate interface, which diffusion is no longer permitted (despite a suitably chosen growth rate) once the pores close to the silica/Ge or SiGe interface are filled. Furthermore, the presence of the surface layer, which contains particles of different sizes, is a drawback.

Moreover, Plyuto et al., *Chem. Commun.*, 1999, 1653-1654, has described the synthesis of silver nanoparticles in a mesoporous silica film deposited chemically on Pyrex slides by ion exchange with $Ag(NH_3)_2^+$ followed by a reduction treatment. The formation of particles starts by the reduction of the $Ag^+$ ions to $Ag^0$ atoms, which migrate into the mesoporous silica matrix and progressively aggregate. Under the conditions described, the nanoparticles formed were distributed randomly in the mesoporous matrix and their size was not uniform.

This irregularity in the formation of the nanoparticles represents a serious drawback for applications in which it is desired to produce a homogeneous effect or property on the surface of the substrate, in particular when the property is associated with the amount of material, the size or the shape of a particle, or the arrangement of the particles, this being the case in particular for optical properties.

It is an object of the present invention to remedy this drawback and to provide a layered material containing nanoparticles of regular structure.

Figure 1:
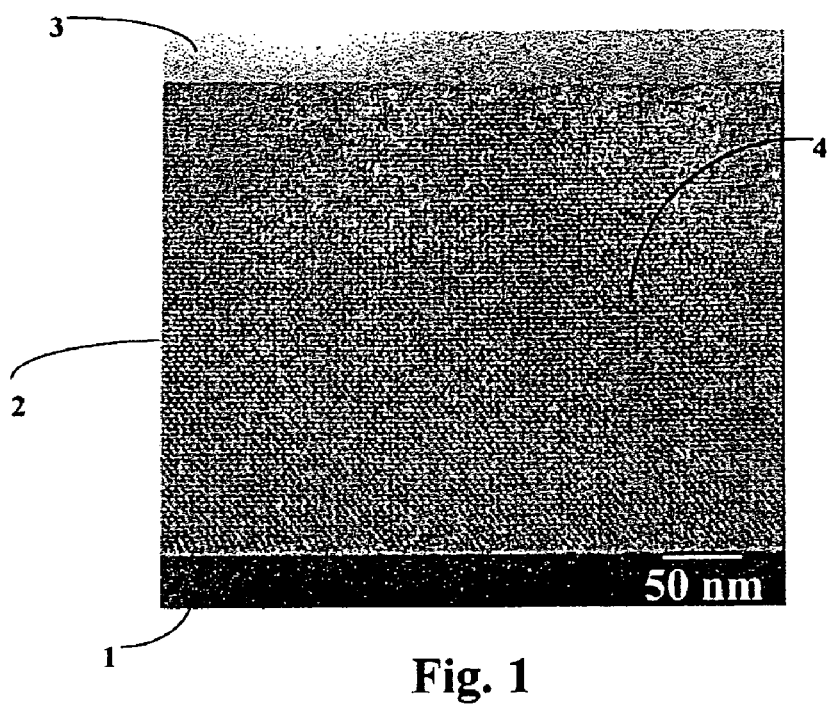
FIG. 1 is a transmission electron micrograph of a substrate of the present invention in cross section and plan view.

This object has been achieved with a substrate coated with a composite film based on a mesoporous mineral layer containing nanoparticles formed in situ inside the layer, characterized in that the composite film has a periodic lattice structure over a major portion of the thickness in which the nanoparticles are present, in which structure the nanoparticles are arranged in a periodic manner on the scale of domains of at least 4 periods in the thickness of the film.

The expression "the composite film has a periodic lattice structure throughout its thickness" means that the nanoparticles and the mineral material that surrounds them are arranged in a geometrical pattern which is repeated by periods over a major portion of the thickness of the film in which the particles are present, preferably over the entire thickness thereof.

Preferably, the periodic lattice is at least two-dimensional, that is to say the geometrical repeat pattern is in two or three dimensions. Preferably, the periodic lattice of the film is three-dimensional, especially one of the hexagonal, cubic or tetragonal type.

This repeat may be identically directed throughout the volume of the material, with a structure which can approximate that of single crystals, or may be identically directed on the scale of domains of at least 4 periods (in general at least about 20 nm) with an overall structure that may approximate that of polycrystals.

Advantageously, the particles are arranged in a periodic manner with at least 5, preferably at least 10, periods per domain. The domains of periodic structure may extend over greater or lesser ranges depending on the size of the particles. As an indication, these domains may have a dimension of at least 20 nm in at least one direction.

Advantageously, this periodic structure of the composite film is obtained from a mesoporous mineral layer of periodic structure on the scale of domains of at least 4 periods of pores (in general at least about 20 nm), forming a matrix on the substrate, by:

depositing at least one precursor in the pores of the matrix layer; and growing particles derived from the precursor with the spatial distribution and the dimensions being controlled by the structure of the pores of the matrix.

Thus, the invention has demonstrated that an ordered mesoporous film structure is capable of accommodating the growth of nanoparticles through the entire thickness and the entire volume desired, by imposing on the particles a regular shape and regular dimensions and a periodic arrangement in space, reproducing the characteristics of the constitutive pores of the film.

According to this embodiment, a major aspect consists in generating the particles inside the pores from a precursor that undergoes in situ a chemical modification so as to be converted into a constitute material of the particle. Compared with the technique relying on the diffusion of the material itself, which coalesces or aggregates inside the pores, the problems of pore blockage near the diffusion source, which limit the penetration of the particles into the core of the thickness of the mesoporous layer, are avoided.

Contrary to what Plyuto et al. were able to observe, the inventors have shown that a mesoporous layer of periodic structure can be the site of ordered particle growth limited by the size of the pores, and they have unexpectedly obtained a periodically structured composite film.

According to a preferred feature, the periodic structure of the composite film is obtained by impregnation of the matrix layer with a liquid composition containing at least one precursor and a liquid vehicle, and controlled growth of particles derived from the precursor. The liquid method seems in fact to be the best method for depositing the precursor(s) inside the pores, by having uniform access to the entire volume desired and especially the thickness of the mesoporous base layer, thereby allowing harmonious and regular growth of the particles in the next step.

According to the invention, the substrate carrying the coating may consist of various materials of the mineral type, such as glass, silica, ceramics, glass-ceramics or metals, or of the organic type such as plastics. For some applications in the optical field, it may be desirable for the substrate to be transparent.

As examples of glass materials, mention may be made of float glass of conventional soda-lime composition, possibly thermally or chemically hardened or tempered, an aluminum borosilicate or sodium borosilicate. As examples of plastics, mention may be made of poly(methyl methacrylate) (PMMA), polyvinyl butyral (PVB), polycarbonate (PC) or polyurethane (PU), thermoplastic ethylene/vinyl acetate copolymer (EVA), poly(ethylene terephthalate) (PET), poly (butylene terephthalate) (PBT), polycarbonate/polyester copolymers, cycloolefin copolymers of the ethylene/norbornene or ethylene/cyclopentadiene type, ionomer resins, for example an ethylene/(meth)acrylic acid copolymer neutralized by a polyamine, thermosetting or thermally crosslinkable polymers such as polyurethane, unsaturated polyester (UPE), ethylene/vinyl acetate copolymer, etc.

The substrate generally has an essentially plane or two-dimensional shape with a variable outline, such as for example a wafer or a disk, but it may also have a volume or three-dimensional shape consisting of the assembly of essentially plane surfaces, for example in the form of a cube or parallelepiped or otherwise, for example in the form of fibers.

It may be coated with composite film on one or more faces.

The composite film according to the invention has a thickness advantageously of between 10 nm and 10 µm (these limit values being inclusive), in particular between 50 nm and 5 µm. Film structures of high quality are produced for film thicknesses of 100 to 500 nm.

The mesoporous mineral layer forming the base of the composite film has a periodic structure on the scale of domains of at least 4 periods. As mentioned above, this means that the layer comprises one or more domains within which the pores are organized following the same repeat pattern repeated at least 4 times, the orientation of a characteristic axis of the patterns possibly being different from one domain to another. The characteristic size of these domains (in general at least about 20 nm) corresponds to a coherent diffraction domain size and can be deduced in a known manner using the Scherrer formula from the width of the main peak of the X-ray diffraction pattern.

The advantage of the relatively large-scale periodicity of the mesoporous base lattice lies in the possibility of distributing the particles in an ordered manner with a distance apart (from center to center) corresponding to the pitch of the repeat pattern with a preferred orientation, for example perpendicular or parallel to the surface of the substrate.

Preferred layers are organized with a periodic structure on the scale of domains of the order of 100 nm, advantageously 200 to 300 nm.

Many chemical elements may be the basis of the mesoporous film: this comprises, as essential constituent material, at least one compound of at least one of the elements: Si, W, Sb, Ti, Zr, Ta, V, Pb, Mg, Al, Mn, Co, Ni, Sn, Zn, Ce.

The mesoporous mineral layer is preferably based on at least one oxide, such as silicon oxide, titanium oxide, etc. For applications in the optics field, the constituent material of the layer may be chosen so that it is transparent at certain wavelengths, especially in the visible range.

According to an advantageous embodiment, the mesoporous mineral layer is obtained by:

bringing the substrate into contact with a liquid composition comprising at least one oxide precursor and at least one organic agent; and precipitating and polycondensing the oxide around the structuring agent.

The metal oxides can be deposited as a film using the sol-gel method as above, with the possibility of controlling in terms of size the porosity according to various generally monodisperse structures, that is to say in which the size of the pores (diameter or equivalent diameter) is calibrated to a defined value in the mesoporous domain: in particular, a pore lattice structure having two-dimensional (2D) hexagonal symmetry with porous channels in the form of straight tubes stacked hexagonally, having three-dimensional (3D) hexagonal symmetry with approximately spherical pores stacked hexagonally, and having possibly distorted three-dimensional cubic symmetry may be mentioned. The three-dimensional structures may be used to establish isotropic properties of the composite film, whereas the two-dimensional structures allow anisotropic properties to be obtained, especially with applications in the nonlinear optics field or optical filters. Once the layer has been filled with particles, the resulting composite film has a periodic lattice structure that retains the same symmetries.

All these structures can be obtained by the above method by adapting the coating composition, particularly the choice of the structuring agent. This method will be described in greater detail below.

The nanoparticles that can be included in the composite film of the substrate according to the invention may especially comprise compounds chosen from:

metals, for example silver, gold, copper, cobalt, nickel, etc., the optical or magnetic properties of which can be exploited;

chalcogenides, especially sulfides or selenides, of one or more metals, for example zinc, lead, cadmium and manganese derivatives, especially ZnS, PbS, (CdMn)S, (CdZn)S, CdSe, ZnSe, the photoluminescence or semiconducting properties of which can be exploited;

oxides of one or more elements, for example silicon, zinc, zirconium and cerium derivatives, which may give the surface layer improved mechanical properties;

halides, especially chlorides, of one or more metals, especially silver chloride, which has photochromic properties, or copper chloride, which absorbs UV radiation;

phosphides;

but also organic compounds.

The particles may consist of a single material, obtained from a single precursor or from several precursors that react together to form a new chemical compound, or of a combination of materials obtained from several precursors that may or may not react together to form composite particles. According to one particular embodiment, the nanoparticles consist of a core around the periphery of which there is a second material in the form of discrete particles such as crystallites or a continuous envelope, in which the peripheral material grows over the core inside the pores of the mesoporous material from a precursor of corresponding material. The material of the core may be of any organic or mineral type and the peripheral material is advantageously chosen from the abovementioned compounds.

Apart from the possibility of distributing the particles in an ordered manner on the surface of the substrate, the invention also makes it possible to optimize the amount of particles deposited on the substrate, more particularly to maximize this amount without the particles aggregating. Thus, the volume fraction occupied by the nanoparticles in the composite film may be around 10 to 70%, in particular around 50%, of the volume of the organized domains.

The subject of the invention is also a process for manufacturing a substrate as described above, which comprises the steps consisting in:
(1) depositing a mesoporous mineral layer on the surface of the substrate;
(2) bringing the mineral layer into contact with a liquid composition containing at least one nanoparticle precursor and a liquid vehicle; and
(3) exposing the precursor-impregnated layer to an influx of energy or to the action of radiation or of at least one liquid or gaseous reactant.

According to a preferred method of implementation, step (1) of depositing the mesoporous layer comprises, in succession:

the preparation of a liquid composition comprising at least one precursor of the material constituting the mesoporous layer, and at least one organic structuring agent;

the application of the composition to the substrate;

the precipitation of the precursor around the organic structuring agent and the growth of molecules derived from the precursor; and the removal of the organic structuring agent.

To manufacture a mesoporous oxide layer, the preparation of the liquid composition advantageously comprises:

the preparation of a sol of oxide precursor in an aqueous alcoholic liquid phase;

the maturing of the sol; and then the mixing with the structuring agent.

This is because maturing the sol allows a preliminary condensation of the oxide precursor that favors the structuring of the oxide layer condensed on the substrate in large domains. Advantageous maturing conditions comprise holding the sol at a temperature of 40 to 60° C. for a time of 30 minutes to 24 hours, the maturing time being shorter the higher the temperature.

In this case, the oxide precursor is advantageously a hydrolyzable compound, such as a halide or an alkoxide, and the structuring agent is advantageously chosen from cationic surfactants, preferably of the quaternary ammonium type, or nonionic surfactants, including copolymers, preferably those based on a polyalkylene oxide, especially diblock or triblock copolymers based for example on ethylene oxide or propylene oxide.

One particularly favorable method of implementing the process of the invention for synthesizing a mesoporous silica layer is one in which the organic structuring agents consist of micelles of cationic surfactant molecules, the precursor for the mesoporous material is a silicon alcoxide, and they are in solution and possibly in hydrolyzed form.

Particularly advantageously, the cationic surfactant is cetyltrimethylammonium bromide and the precursor of the mesoporous material is a silicon alkoxide in partially or completely hydrolyzed form.

In the sol, the organic structuring agent/silicon molar ratio may be of the order of $10^{-4}$ to 0.5, preferably $10^{-3}$ to 0.5, advantageously from 0.01 to 0.1.

With a cationic structuring agent of the quaternary ammonium type, the structuring agent/silicon molar ratio is preferably of the order of 0.1; with a nonionic structuring agent of the copolymer type, the structuring agent/silicon molar ratio is preferably of the order of 0.01.

This sol can be applied with a variable thickness, especially by adapting the concentration of the sol by diluting it. The presence of a diluent, preferably an alcohol, exacerbates the positive effect, due to the evaporation of the solvent, on the homogeneous texturing of the coating. In an optimized method of producing a mesoporous silica layer, the mixture is diluted with an alcohol in a volume ratio of 1/1 to 1/30, preferably 1/1 to 1/5, in particular 1/1 to 1/3, for application of a thin layer of around 100 to 400 nm.

After the sol has been deposited, the substrate generally undergoes drying in the open air or in nitrogen, during which the polymerization of the oxide lattice around the structuring agents continues.

Next, the structuring agents may be removed, for example by calcination, by solvent extraction or by ozonolysis (the combined action of oxygen and JVC rays). Nonthermal treatments are preferred when the substrate is organic, such as a plastic substrate.

Step (2) of the process according to the invention consists in impregnating the mesoporous base layer with a liquid composition containing at least one nanoparticle precursor.

According to one particular method of implementation, the nanoparticle precursor is a metal complex or salt soluble in the liquid vehicle: the metal ions penetrate into the pores of the base layer and can be fixed thereto by various types of interaction, for example of the polar type or by ion exchange with the surface of the pores.

The liquid composition may contain complexing agents in order to prevent the metal from precipitating, especially in the form of hydroxides in aqueous medium. Aqueous ammonia, amines or carboxylates may be used as complexing agents.

The impregnation composition is designed not to degrade the mesoporous mineral matrix.

For aqueous compositions, one important parameter may be the pH of the impregnation composition.

This is because, when the mesoporous matrix is based on a metal oxide or other element, a composition that is too basic may be prejudicial to the porous structure, by dissolving the walls of the pores.

Preferably, the liquid impregnation composition has a pH of less than or equal to 10.

Moreover, the pH of the composition may be adjusted in order to optimize the interaction between the precursor and the mesoporous layer, in particular it may be adjusted within a range that favors adsorption of the precursor species on the walls of the pores.

The counterions or ligands are chosen so as to obtain soluble species within the preferred pH range.

The impregnation may be carried out by immersing or dipping the substrate into the liquid composition or by any other method of applying liquid to a solid.

To increase the efficiency of the impregnation step, especially if the precursor has a low affinity for the material of the mesoporous mineral layer, the process may comprise an intermediate step (1') in which the mesoporous mineral layer is treated in order to increase the reactivity of the pores with respect to the precursor(s), especially by grafting onto the surface of the pores reactive groups that interact with the precursor(s) chemically or electrostatically.

Thus, in this intermediate treatment step, it is possible to graft onto the surface of the pores groups that complex with the precursors. Such a treatment may be carried out in a liquid or a gaseous medium.

In the case of a mesoporous mineral oxide layer, the treatment may consist in making the layer react with an alkoxide, especially a silicon alkoxide, functionalized by a reactive group, or with an alumina precursor functionalized by a reactive group.

The impregnation step (2) may be followed by a rinsing step (2') in order to remove the excess material, in particular to avoid accumulation of precursor at the film/air interface, which could be liable to completely obstruct the surface pores.

In general, the interactions between the functional groups on the walls of the pores and the precursor, in particular metal cations, are sufficiently strong for the precursor to be retained in the pores despite the rinsing.

Step (3), which consists in making the precursor react in situ in the pores, may use an influx of thermal energy or the action of radiation, such as ultraviolet radiation, or a liquid or gaseous reactant.

Among reactants, a gaseous reactant is preferable as it generally guarantees instantaneous penetration in all the pores of the material, allowing simultaneous conversion of the precursor and particle growth throughout the volume of the mesoporous matrix, thereby avoiding the problems associated with the diffusion of the species and the clogging of pores.

To form the particles of the materials indicated above, the gaseous reactant may be chosen from a gas based on a chalcogen, for example based on sulfur, selenium or tellurium, for example $H_2S$ or $H_2Se$, a gas based on a halide, especially one based on a chlorine, for example HCl or $Cl_2$, a reducing gas, for example $H_2$, and an oxidizing gas, for example $O_2$, especially an $O_2/N_2$ mixture.

In a preferred method of implementation, the impregnated layer is treated at a temperature of less than or equal to 300° C., particularly at 200° C., especially at 1500° C. A moderate temperature prevents the diffusion and aggregation of the particles and guarantees that the mesoporous structure is stable over the reactive treatment. Reactive treatments at room temperature are preferred.

During the reaction of converting the particle precursor, the chemical species formed generally does not have the same interaction with the surface of the pore, and the precursor attachment site in the pore is freed and able to receive a new precursor molecule as long as the particles have yet to occupy the entire volume of the pore.

Thus, the impregnation step (2) and the reaction step (3) may be repeated in order to achieve the desired degree of filling, if necessary until saturation of the mesoporous mineral layer.

The filling of the mesoporous layer may be monitored by various methods, especially by spectrophotometry or X-ray diffraction.

After a certain number of impregnation-reaction cycles, it is observed that the properties of the composite film obtained no longer change, which means that the mesoporous layer is completely saturated with particles.

It has been verified that the growth of the particles is controlled by the mesoporosity of the base layer and that the size of the particles formed is limited by the size of the pores, that is to say the particles grow at each cycle until a maximum size corresponding to the size of the pores.

In certain cases, a kind of contraction, or on the contrary expansion, of the mesoporous layer may be observed so that dimensional parameters of the structure of the composite film are slightly modified (reduced or increased) compared with the dimensional parameters of the structure of the initial mesoporous mineral layer, without the geometry of the lattice repeat unit being altered.

The substrate according to the invention may have several applications depending on the nature of the particles.

In this regard, the subject of the invention is also the application of a substrate as described above to the production of solar concentrators, especially for photovoltaic cells, to quantum boxes, and materials for magnetism or nonlinear optics. For this purpose, the material may be treated or coated with one or more additional protective or functional layers.

The following examples illustrate the invention.

EXAMPLE 1

This example describes the manufacture of a silica layer filled with cadmium sulfur nanoparticles on a Pyrex glass substrate.

Firstly, a silica sol was prepared by mixing tetraethoxyorthosilicate TEOS (or tetraethoxysilane) of formula $Si(OC_2H_5)_4$ with water acidified to pH=1.25 by HCl and with ethanol in a 1/5/3.8 molar ratio. The mixture was matured for 1 hour at 60° C. (The optimum range for maturing a silica sol is in general 30 minutes to 1 hour at 60° C., or, equivalently, from 2 to 6 hours at 40° C.)

A cationic surfactant of the quaternary ammonium type was then added to the colorless transparent sol, principally composed of silicic acid $Si(OH)_4$, which is the product resulting from the hydrolysis of TEOS and of low-molecular-weight oligomers $(SiO)_n$.

The chosen surfactant was cetyltrimethylammonium bromide (CTAB) introduced in an amount such that the CTAB/Si molar ratio was equal to 0.1. Given its amphiphilic nature, the surfactant formed micellar supramolecular structures. The CTAB/Si molar ratio of 0.1 is optimal for obtaining micellar structures arranged so as to form a periodic structure.

The solution obtained was diluted with ethanol in a 1/1 volume ratio.

The solution was deposited on Pyrex slides 2.5 cm by 2.5 cm by spin coating: according to this technique, the specimen is rapidly rotated during deposition; this spin-coating operation is characterized by a speed of 3000 rpm and a rotation time of around 100 s.

The CTAB was then extracted from the film of each specimen by calcination in a tube furnace at 450° C. in air with a temperature rise of 10° C./h. The film thus formed was transparent and mesoporous, and its thickness, determined by profilometry, was about 300 nm.

Using different dilution factors, the thickness of the mesoporous silica film could be varied. Thus, by choosing a volume ratio from 2/1 to 1/4, it was possible to obtain layer thicknesses of around 400 to 100 nm.

The porous lattice corresponds to the volume left vacant by the removal of the CTAB micelles, taking into account the contractions that may occur during inter alia the heating/calcining operations. The pore volume of this layer was 55% with respect to the total volume of the film.

The characteristics of the porous lattice were determined by X-ray diffraction, X-ray scattering at grazing incidence and transmission electron microscopy. These analyses indicated a three-dimensional hexagonal structure ($P6_3$/mmc space group with the hexagonal symmetry axis perpendicular to the plane of the substrate). The pores were approximately spherical with a uniform diameter of around 3.5 nm.

Figure 2:
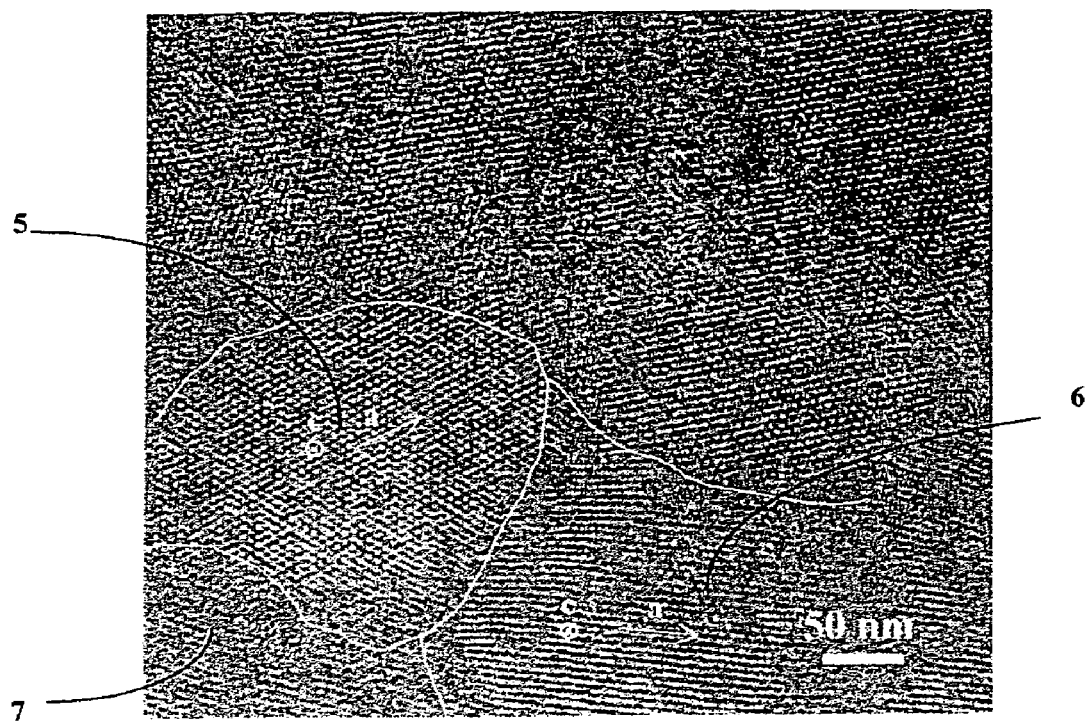
FIG. 2 is a transmission electron micrograph of a substrate of the present invention having large domains in cross section and plan view.

FIGS. 1 and 2 are transmission electron micrographs in cross section and in plan view.

FIG. 1 shows that the mesoporous layer 2 has a periodic lattice structure over its entire thickness from the interface with the substrate 1 as far as the interface with the air 3. The pores 4 are aligned parallel to the surface of the substrate.

FIG. 2 shows the existence of large domains 5, 6, 7, having a size of greater than 200 nm in all directions in the plane. Within each domain, the pores are arranged in a repeat pattern of the hexagonal lattice over several tens of periods, but the orientation of the repeat axis (a) in the plane of the substrate varies from a domain 5 to a neighboring domain 6 or 7. From one domain to another, the orientation of the hexagonal symmetry axis (c) is unchanged, always perpendicular to the surface of the substrate.

This structure is similar to that of a polycrystalline material in which all the grains have a common orientation with respect to the substrate.

The mesoporous layer is said to be structured in terms of a periodic lattice, on the scale of 200 nm domains, and is monodisperse in terms of size.

This structure may also be obtained by immersion and pulling from the silica sol (or "dip coating").

An impregnation solution based on cadmium nitrate was prepared. One equivalent of aqueous ammonia and one equivalent of sodium citrate were added to a 0.1M aqueous cadmium nitrate solution and the pH was adjusted to 9.5 by adding aqueous ammonia. $NH_3$ and the citrate act as ligands which complex the cadmium nitrate and prevent cadmium hydroxide from precipitating.

The pH of 9.5 is optimal, since the adsorption of cadmium ions on silica is optimal above pH 9, whereas dissolution of the silica walls becomes critical beyond pH 10.

The Pyrex substrate coated with the mesoporous silica layer was dipped into the impregnation solution for about one minute and then extracted and washed with deionized water in order to remove the excess cations, particularly those close to the surface. During this operation, the metal cations become attached to the surface of the silica pores by complexing SiO⁻ groups of the surface silanols of the silica. The SiO/Cd interaction resists the operation of washing with water.

The specimen was then placed in a chamber under a rough vacuum, into which gaseous hydrogen sulfide $H_2S$ was slowly injected at room temperature until atmospheric pressure was reached. Precipitation of CdS sulfide particles by the reaction of sulfur with the complexed Cd was instantaneous and took place locally in the core of the porous cavity simultaneously in all the pores. Precipitation of the sulfide results in regeneration of the SiO⁻ sites.

The impregnation and $H_2S$ reaction steps were repeated several times.

The $Cd^{2+}$-impregnated film was colorless. After reaction with $H_2S$, it turned slightly yellow and the intensity of the coloration increased with the treatment cycles.

Analysis of the substrate by secondary ion mass spectroscopy (SIMS) showed a uniform distribution of CdS through the thickness of the layer.

Figure 3:
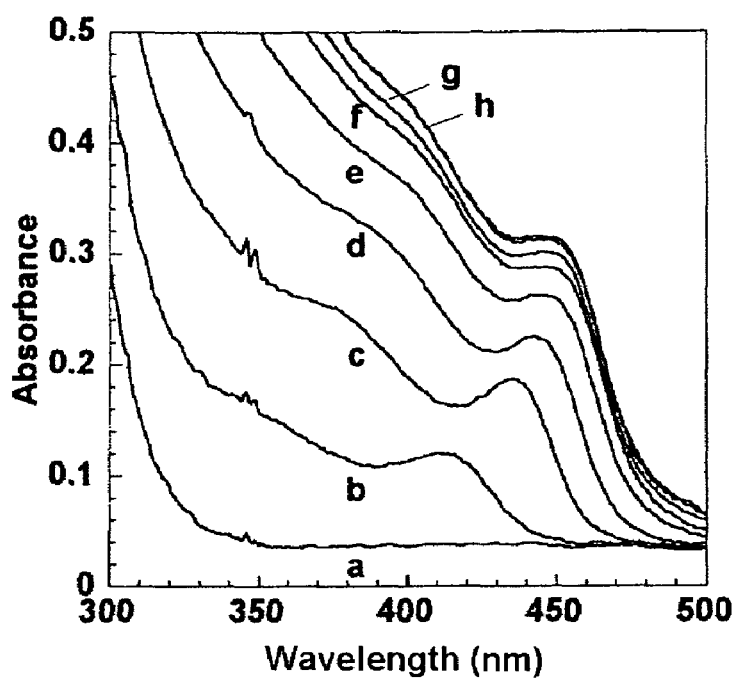
FIG. 3 relates to absorption spectra for the substrate of example 1.

The filling of the layer was monitored by absorption, spectrophotometry, illustrated by the spectra in FIG. 3: the absorbence increases with the number of cycles to a ceiling reached at the eighth cycle (curve a represents the spectrum obtained after the first dipping in the cadmium solution, curve b represents the spectrum obtained after the first $H_2S$ treatment; curves c, d, e, f and g represent the spectra obtained after 2, 3, 4, 5, 7 cycles respectively and curve h represents the spectra obtained after the 8th and 9th cycles, the spectra being superimposed on each other).

After the ninth cycle, the absorbence no longer changed, proving that there was no more CdS in the layer than in the preceding cycle. The mesoporous layer was therefore saturated with CdS.

From the absorption spectra correlation curves, it was possible to determine the size of the aggregates by means of the energy of the energy transition. It was concluded that the distribution of the particle sizes is very narrow, centered on 3.5 nm.

Characterization by X-ray diffraction confirmed that the three-dimensional hexagonal structure was preserved.

Figure 4:
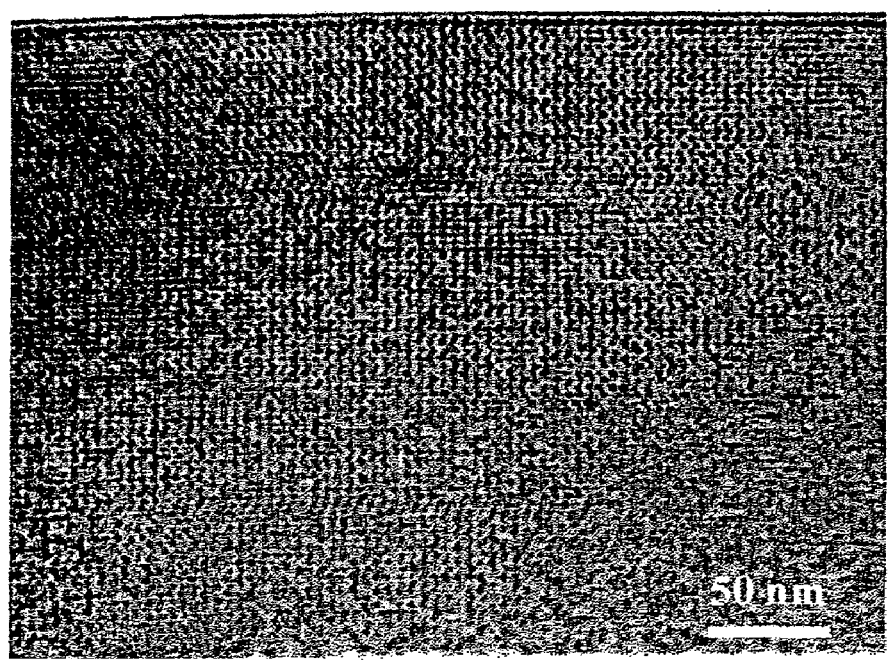
FIG. 4 is a transmission electron micrograph of the substrate of example 1 in cross section.

This was confirmed by transmission electron microscope observation, illustrated by the image in FIG. 4, which shows a cross-sectional image. It may be seen that the mesoporous layer is completely filled with CdS nanoparticles, which maintain the arrangement of the pores of the initial layer. A composite film containing about 50% by volume of CdS particles was thus obtained.

EXAMPLE 2

A similar structure of ZnS nanoparticles was produced in a silica layer on a substrate by modifying example 1 in the following manner.

Firstly, as in example 1, the same mesoporous silica layer was deposited on a substrate.

The impregnation solution this time was composed of an aqueous zinc nitrate solution of 0.1M concentration, to which 1 molar equivalent of sodium citrate was added. The pH was then adjusted to 7.5 by adding aqueous ammonia. In general the adsorption of the zinc ions is optimal within a pH range above pH 7. It is advantageous for this range to be around 7 to 10, preferably close to neutrality between 7 and 8, in order for the silica not to suffer the effect of the walls of the pores dissolving.

The impregnation and $H_2S$ treatment steps were carried out as in example 1, with the ZnS particle growth monitored by UV/visible spectrophotometry, and repeated until it was no longer possible to distinguish two successive absorption spectra.

The composite film obtained after 7 impregnation/treatment cycles had the same periodic lattice structure of hexagonally stacked particles over the entire thickness of the silica layer.

EXAMPLE 3

This example describes the growth of CdS aggregates in another mesoporous silica layer.

A silica sol was prepared as in example 1 by mixing TEOS with acidified water and ethanol in a 1/5/3.8 molar ratio. The mixture was matured for 1 hour at 60° C.

The structuring agent was a nonionic surfactant consisting of a triblock copolymer of the polyoxyethylene/polyoxypropylene/polyoxyethylene type. The Pluronic PE6800 product of formula $EO_{73}PO_{28}EO_{73}$ (EO standing for ethylene oxide and PO standing for propylene oxide) was chosen. It was added to the silica sol in a copolymer/Si molar ratio of 0.01.

The solution was then diluted with ethanol in a 1/2 volume ratio. The deposition and calcination steps were the same as in example 1.

A mesoporous silica layer 200 nm in thickness was obtained. Using this structuring agent, it was possible to choose a dilution volume ratio of 1/1 to 1/2 in order to obtain silica layers of about 400 to 200 nm in thickness.

The porous lattice, corresponding to the volume left vacant by removal of the Pluronic micelles, also had a three-dimensional structure of pores monodisperse in size.

Figure 5:
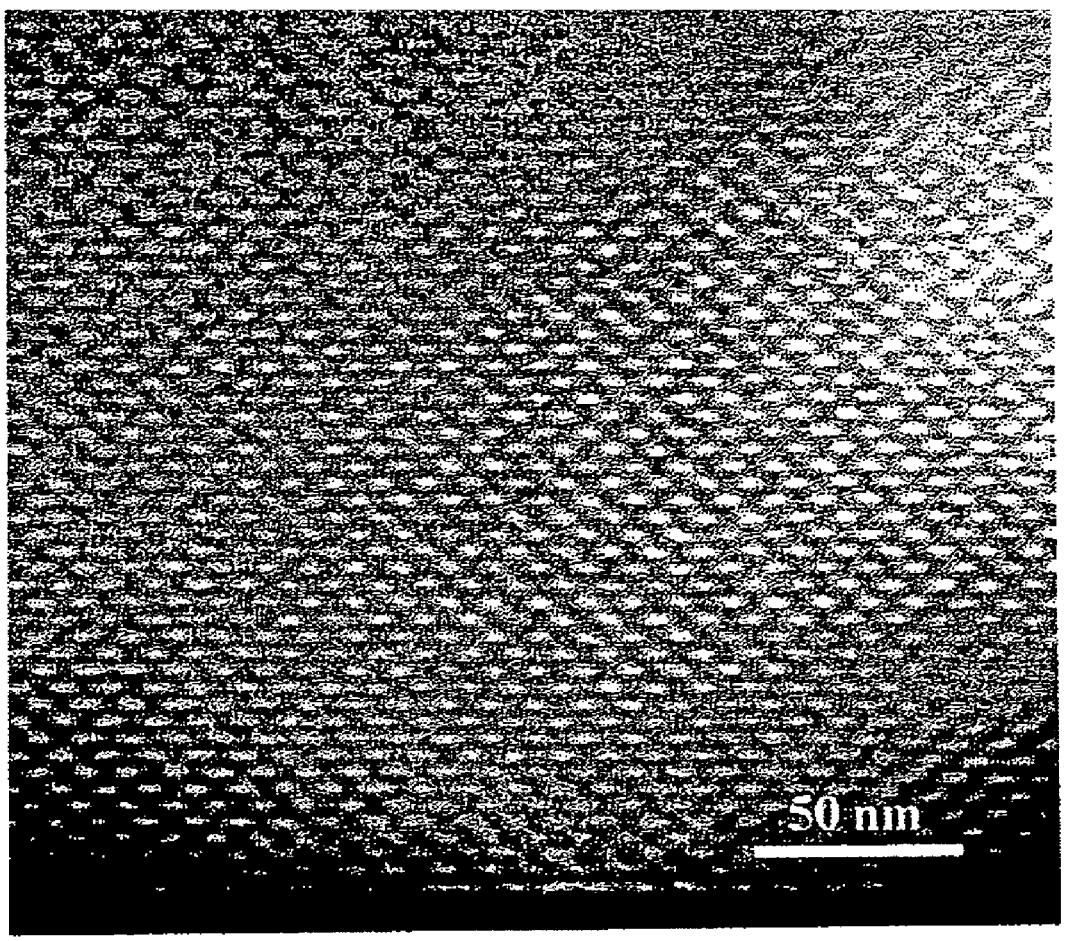
FIG. 5 is a transmission electron micrograph in cross section illustrating the periodic pores of the substrate of example 3.

FIG. 5 is a cross-sectional transmission electron micrograph illustrating the periodic distribution of the pores.

The substrate coated with this mesoporous silica layer was subjected to the same operations of impregnation with the cadmium nitrate solution and of treatment by $H_2S$ as in example 1. A layer saturated with CdS nanoparticles was obtained after 5 impregnation/treatment cycles.

EXAMPLE 4

This example describes the growth of silver nano-particles in a mesoporous silica layer of three-dimensional hexagonal structure.

An impregnation solution based on silver nitrate was prepared. One molar equivalent of citrate was added to an aqueous 0.1M silver nitrate solution; a white silver citrate precipitate appeared. Next, aqueous ammonia was added until the precipitate dissolved (pH=9.5). The pH of 9.5 is optimal as the adsorption of silver ions on the silica is optimal above pH 9, whereas dissolution of the silica walls becomes critical beyond pH 10.

The mesoporous silica film deposited on the substrate was impregnated for one minute in this solution, rinsed and dried as in example 1.

Next, hexamethyldisilazane (HMDS, of formula $(CH_3)_3$—Si—NH—Si—$(CH_3)_3$) was grafted. This molecule makes it possible to limit the diffusion of silver ions during the subsequent reduction of silver$^{(I)}$ and thus prevent the formation of coarse particles.

The impregnated substrate was placed in a cell containing 200 μl of HMDS and the cell was placed under vacuum and hermetically sealed; the cell was then heated to a temperature of about 70° C. for about 5 minutes. The cell was then purged in order to remove the excess HMDS.

Finally, the operation to reduce the $Ag^+$ ions was carried out, it being possible to do this in an argon/hydrogen atmosphere at 100° C. for 4 h or in an atmosphere of pure hydrogen for one hour.

The final product was characterized by transmission electron microscopy, in which the cross-sectional micrograph shows a film filled with nanoparticles. This micrograph shows that the particles have a narrow size distribution, and shows alignments of particles. The size distribution is narrow, with a mean of 3.4 nm and a standard deviation of 0.64. The diffraction of the micrograph shows that the particles are distributed with the 3D hexagonal structure of the $P6_3/mmc$ space group.

The invention claimed is:

1. A substrate coated with a composite film based on a mesoporous mineral layer comprising nanoparticles formed in situ inside the layer, wherein the composite film has a periodic lattice structure over a major portion of the thickness in which the nanoparticles are present, in which structure the nanoparticles are arranged in a periodic manner on the scale of domains of at least 4 periods in the thickness of the film.

2. The coated substrate as claimed in claim 1, wherein the periodic lattice is at least two-dimensional.

3. The coated substrate as claimed in claim 1, wherein the periodic structure of the composite film is obtained from a mesoporous mineral layer of periodic structure on the scale of domains of at least 4 periods of pores, forming a matrix on the substrate, by: depositing at least one precursor in the pores of the matrix layer; and growing particles derived from the precursor with the spatial distribution and the dimensions being controlled by the structure of the pores of the matrix.

4. The coated substrate as claimed in claim 3, wherein the periodic structure of the composite film is obtained by impregnation of the matrix layer with a liquid composition comprising at least one precursor and a liquid vehicle, and controlled growth of particles derived from the precursor.

5. The coated substrate as claimed in claim 1, wherein the substrate is made up of a mineral material or an organic material.

6. The coated substrate as claimed in claim 5, wherein the substrate is made up of a mineral material selected from the group consisting of glass, silica, and ceramic.

7. The coated substrate as claimed in claim 5, wherein the substrate is made up of a plastic organic material.

8. The coated substrate as claimed in claim 1, wherein the composite film has a thickness of 10 nm to 10 µm.

9. The coated substrate as claimed in claim 8, wherein the composite film has a thickness of from 50 nm to 5 µm.

10. The coated substrate as claimed in claim 1, wherein the mesoporous mineral layer is based on at least one metal oxide.

11. The coated substrate as claimed in claim 10, wherein the mesoporous mineral layer is obtained by: bringing the substrate into contact with a liquid composition comprising at least one oxide precursor and at least one organic agent; and precipitating and polycondensing the oxide around the structuring agent.

12. The coated substrate as claimed in claim 10, wherein the mesoporous mineral layer has a pore lattice structure having three-dimensional symmetry.

13. The coated substrate as claimed in claim 1, wherein the nanoparticles comprise compounds chosen from metals, chalcogenides, oxides, halides, phosphides and organic compounds.

14. The coated substrate as claimed in claim 1, wherein the nanoparticles are composite particles, consisting of a core and a peripheral material.

15. The coated substrate as claimed in claim 1, wherein the volume fraction occupied by the nanoparticles in the domain or domains is around 10 to 70% of the volume of the domain.

16. A solar concentrator comprising the coated substrate according to claim 1.

* * * * *